(12) United States Patent
Wang et al.

(10) Patent No.: US 11,172,428 B2
(45) Date of Patent: Nov. 9, 2021

(54) BROADCASTING AND DISCOVERING METHODS, BROADCASTING AND DISCOVERING DEVICES AND STORAGE MEDIUM

(71) Applicant: BEIJING XIAOMI MOBILE SOFTWARE CO., LTD., Beijing (CN)

(72) Inventors: Yanjiong Wang, Beijing (CN); Zheng Li, Beijing (CN); Jinping Qu, Beijing (CN); Jingchao Liu, Beijing (CN); Xiaobo Peng, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/928,176

(22) Filed: Jul. 14, 2020

(65) Prior Publication Data
US 2021/0153104 A1    May 20, 2021

(30) Foreign Application Priority Data

Nov. 20, 2019  (CN) .......................... 201911143717.0

(51) Int. Cl.
*H04W 4/00* (2018.01)
*H04W 48/10* (2009.01)
(Continued)

(52) U.S. Cl.
CPC ............. *H04W 48/10* (2013.01); *H04W 4/06* (2013.01); *H04W 48/16* (2013.01)

(58) Field of Classification Search
CPC ........ H04W 48/10; H04W 4/06; H04W 48/16
(Continued)

(56) References Cited

U.S. PATENT DOCUMENTS 9,226,117 B2 *  12/2015 Vos ......................... H04W 4/06
10,582,274 B2 *   3/2020 Kwak .................. H04N 21/462
(Continued)

FOREIGN PATENT DOCUMENTS

WO      2017023998 A1      2/2017

OTHER PUBLICATIONS

Extended European Search Report in Application No. 20190380.4, dated Feb. 2, 2021.

*Primary Examiner* — Amancio Gonzalez
(74) *Attorney, Agent, or Firm* — Syncoda LLC; Feng Ma (57) ABSTRACT

A broadcasting method includes: acquiring and analyzing a service application broadcast request; determining a broadcast message with preset content parameters according to the service application broadcast request, wherein the preset content parameters include broadcast protocol version parameter, service application parameter, role parameter that characterizes broadcast role or discovery role, broadcasting device name parameter, and broadcast configuration identification parameter; and broadcasting the broadcast message. A discovering method includes: acquiring broadcast messages with preset content parameters; and screening the broadcast messages in accordance with a target service application to obtain the broadcast message matched with the target service application. As such, mutual compatibility between multiple different broadcast and discovery techniques and service discovery in all scenes can be realized, and resource utilization can be improved.

20 Claims, 4 Drawing Sheets

(51) Int. Cl.
*H04W 4/06* (2009.01)
*H04W 48/16* (2009.01)

(58) Field of Classification Search
USPC .......................................... 455/434
See application file for complete search history.

(56) References Cited

U.S. PATENT DOCUMENTS

| | | |
|---|---|---|
| 10,637,595 B2 * | 4/2020 | Yang .................. H04L 65/4076 |
| 10,848,817 B2 * | 11/2020 | Yang .................. H04N 21/4104 |
| 10,903,922 B2 * | 1/2021 | Lee .................. H04N 21/23614 |
| 2015/0109897 A1 | 4/2015 | Lee et al. |
| 2015/0341446 A1 | 11/2015 | Nguyen et al. |
| 2017/0181212 A1 | 6/2017 | Chau |
| 2017/0342741 A1 | 11/2017 | Holland et al. |
| 2017/0347264 A1 | 11/2017 | Holland et al. |
| 2020/0296434 A1 * | 9/2020 | Kwak .................. H04N 21/858 |

* cited by examiner

BROADCASTING AND DISCOVERING METHODS, BROADCASTING AND DISCOVERING DEVICES AND STORAGE MEDIUM

CROSS-REFERENCE TO RELATED APPLICATION

This application claims priority to Chinese Patent Application No. 201911143717.0 filed on Nov. 20, 2019, the disclosure of which is hereby incorporated by reference in its entirety.

BACKGROUND

Service-based broadcast and discovery technologies are applied more and more widely, such as in the field of consumer communications.

SUMMARY

The present disclosure relates generally to the field of communication technologies, and more specifically to broadcasting and discovering methods, broadcasting and discovering devices and a storage medium.

According to a first aspect of the embodiments of the present disclosure, there is provided a broadcasting method including: acquiring and analyzing a service application broadcast request; determining a broadcast message with preset content parameters according to the service application broadcast request; and broadcasting the broadcast message.

In some embodiments, the preset content parameters include broadcast protocol version parameter, service application parameter, role parameter that characterizes broadcast role or discovery role, broadcasting device name parameter, and broadcast configuration identification parameter.

In some embodiments, the service application parameter includes service application identification for identifying corresponding service applications.

In some embodiments, the preset content parameters further include broadcast data parameter; and when the service application broadcast request includes at least one broadcast request of the same service application, the broadcast parameter can characterize broadcast data corresponding to all the broadcast requests in the at least one broadcast request.

In some embodiments, the broadcast data parameter includes at least one broadcast data identification for identifying corresponding broadcast data.

In some embodiments, the broadcasting the broadcast message includes:
broadcasting the same broadcast message by multiple broadcast techniques.

According to a second aspect of the embodiments of the present disclosure, there is provided a discovering method including:
acquiring broadcast messages with preset content parameters; and
screening the broadcast messages in accordance with a target service application to obtain the broadcast message matched with the target service application.

In some embodiments, the preset content parameters include broadcast protocol version parameter, service application parameter, role parameter that characterizes broadcast role or discovery role, broadcasting device name parameter, and broadcast configuration identification parameter.

The screening the broadcast messages in accordance with the target service application to obtain the broadcast message matched with the target service application includes:
screening out the broadcast message matched with the broadcast protocol version, the service application identification, the role, the broadcasting device name and the broadcast configuration identification according to one or more of the broadcast protocol version, the service application identification, the role, the broadcasting device name and the broadcast configuration identification supported by the target service application.

According to a third aspect of the embodiments of the present disclosure, there is provided a broadcasting device including:
an acquiring component configured to acquire and analyze a service application broadcast request; a determining component configured to determine a broadcast message with preset content parameters according to the service application broadcast request; and a broadcasting component configured to broadcast the broadcast message.

In some embodiments, the preset content parameters include broadcast protocol version parameter, service application parameter, role parameter that characterizes broadcast role or discovery role, broadcasting device name parameter and broadcast configuration identification parameter.

In some embodiments, the service application parameter includes service application identification for identifying corresponding service applications.

In some embodiments, the preset content parameters further include broadcast data parameter.

When the service application broadcast request includes at least one broadcast request of the same service application, the broadcast parameter can characterize broadcast data corresponding to all the broadcast requests in the at least one broadcast request.

In some embodiments, the broadcast data parameter includes at least one broadcast data identification for identifying corresponding broadcast data.

In some embodiments, the broadcasting component is configured to broadcast the same broadcast message by multiple broadcast techniques.

According to a fourth aspect of the embodiment of the present disclosure, there is provided a discovering device including:
an acquiring component configured to acquire broadcast messages with preset content parameters; and a screening component configured to screen the broadcast messages according to a target service application so as to obtain the broadcast message matched with the target service application.

In some embodiments, the preset content parameters include broadcast protocol version parameter, service application parameter, role parameter that characterizes broadcast role or discovery role, broadcast device name parameter, and broadcast configuration identification parameter.

The screening component is configured to screen out the broadcast message matched with the broadcast protocol version, the service application identification, the role, the broadcasting device name and the broadcast configuration identification according to one or more of the broadcast protocol version, the service application identification, the role, the broadcasting device name and the broadcast configuration identification supported by the target service application.

According to a fifth aspect of the embodiments of the present disclosure, there is provided a broadcasting device including:

a processor; and memory storing instructions for execution by the processor to implement operations of the broadcasting method according to the first aspect or any embodiment of the first aspect.

According to a sixth aspect of the embodiments of the present disclosure, there is provided a discovering device including:

a processor; and memory storing instructions for execution by the processor to implement operations of the discovering method according to the second aspect or any embodiment of the second aspect.

According to a seventh aspect of the embodiments of the present disclosure, there is provided a non-transitory computer-readable storage medium, wherein the broadcasting method according to the first aspect or any embodiment of the first aspect can be executed by a processor when instructions in the storage medium are executed by the processor.

According to an eighth aspect of the embodiments of the present disclosure, there is provided a non-transitory computer-readable storage medium, wherein the discovering method according to the second aspect or any embodiment of the second aspect can be executed by a processor when instructions in the storage medium are executed by the processor.

It should be understood that the above general description and the following detailed description are exemplary and explanatory, and are not intended to limit the present disclosure.

BRIEF DESCRIPTION OF THE DRAWINGS

The accompanying drawings, which are incorporated in and constitute a part of this disclosure, illustrate embodiments consistent with the disclosure and, together with the disclosure, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of devices and methods consistent with aspects related to the disclosure as recited in the appended claims.

Service broadcast and discovery may be implemented for specific service through specific broadcast and discovery technologies. Many broadcast and discovery technologies are often not compatible with low utilization of the resource.

The broadcasting and discovering methods provided by various embodiments of the present disclosure may be applied in the field of consumer communications. Various reliable broadcasting and discovering methods are currently available in the field of consumer communication, for example, multicast domain name system (mDNS) commonly adopted in the local area network (LAN), and Bluetooth low energy (BLE), near field communication (NFC) and Wi-Fi Aware that do not depend on online conditions. However, various current broadcasting and discovering methods respectively support various broadcast protocols; specific service implements service broadcast and discovery through specific broadcast and discovery methods; and the broadcasting methods are not compatible with the discovering methods. Thus, a device that supports multiple services needs to provide a plurality of broadcast and discovery techniques that are not compatible with each other for the multiple services. The broadcast and discovery for one service will have different technical implementations by different devices. One broadcast and discovery implementation will be adopted by multiple services in different forms on one device. Specific broadcast and discovery techniques cannot meet the all scenes need from some services.

In view of this, various embodiments of the present disclosure provide a broadcasting and discovering methods, which can broadcast messages with preset content parameters to realize the component of content and format of the broadcast message broadcasted by various broadcast and discovery techniques. In the process of service discovery, the broadcast messages with the preset content parameters are screened according to a target service application to obtain a broadcast message matched with the target service application. By adopting the embodiments of the present disclosure, the broadcast and discovery of the services among the devices have better compatibility, thereby covering all the scenes of broadcast and discovery.

Figure 1:
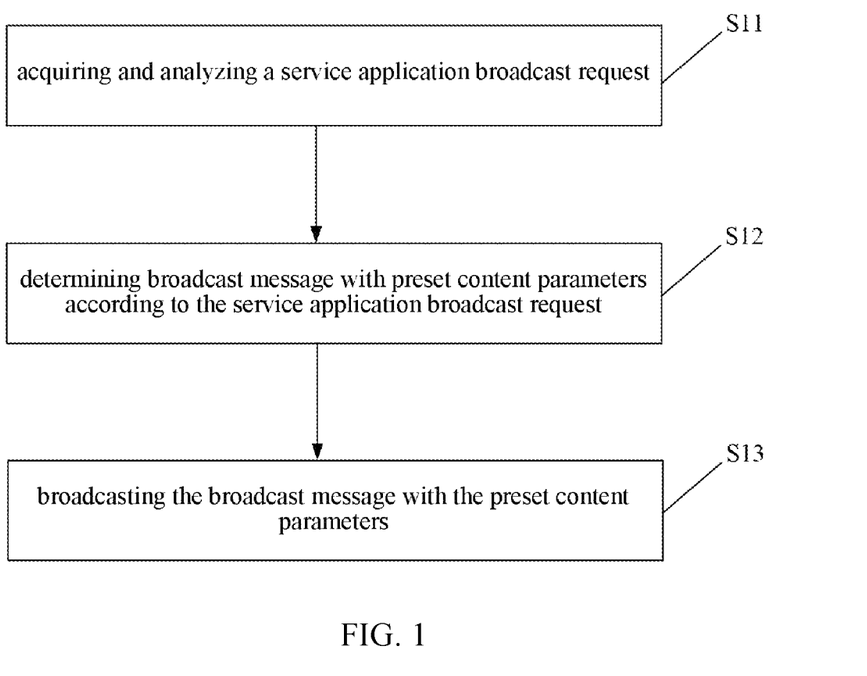
FIG. 1 is a flowchart illustrating a broadcasting method according to some embodiments.

FIG. 1 is a flowchart illustrating a broadcasting method according to some embodiments. Referring to FIG. 1, the broadcasting method comprises:

S11: acquiring and analyzing a service application broadcast request.

In the present disclosure, the service application broadcast request may be a broadcast request sent by a broadcast technique that supports different broadcast protocols. For example, it may be a service application broadcast request supporting one or more of the broadcast protocols among mDNS, BLE, NFC, universal plug and play (UPNP) and Wi-Fi Aware.

S12: determining broadcast messages with preset content parameters according to the service application broadcast request.

In some embodiments of the present disclosure, the content and the format contained in the broadcast message are uniformly defined in advance. For instance, preset content includes broadcast protocol version information, service application information, role information that characterizes broadcast role or discovery role, broadcast device name information, and broadcast configuration identification information. The broadcast message contains preset content parameters which are adopted to characterize the preset content. For instance, the preset content parameters include broadcast protocol version parameter, service application parameter, role parameter that characterizes broadcast role or discovery role, broadcast device name parameter, and broadcast configuration identification parameter.

Moreover, in some embodiments of the present disclosure, the format of the content contained in the broadcast message may be preset, so as to identify different contents in different formats. For instance, the service application parameter includes service application format identification, and different service application format identifications are used for identifying different service applications.

Furthermore, in some embodiments of the present disclosure, the broadcast message may also include broadcast data parameter which is adopted to characterize broadcast data corresponding to the broadcast request. Herein, the broadcast data parameter includes at least one broadcast data identification, and different broadcast data identifications are used for identifying different broadcast data.

In some embodiments of the present disclosure, different identification digits may be adopted to identify different service applications and identify different broadcast data.

S13: broadcasting the broadcast message with the preset content parameters.

In some embodiments of the present disclosure, after obtaining the broadcast message with the preset content parameters, various broadcast techniques may be adopted to broadcast the broadcast message. For instance, in some embodiments of the present disclosure, after obtaining the broadcast message, one or more broadcast techniques among mDNS, BLE, NFC, UPNP and Wi-Fi Aware may be adopted for broadcast.

In some embodiments of the present disclosure, the broadcast message with the preset content parameters is broadcasted to realize the broadcast of broadcast data that support various different broadcast protocols through unified broadcast message, and then the broadcast and discovery of various services and among devices can have better compatibility, so that the broadcast and discovery technique can cover all the scenes of broadcast and discovery.

In some embodiments of the present disclosure, when the service application broadcast request is one or more (at least one) broadcast requests of the same service application, the broadcast parameter can characterize broadcast data corresponding to all the broadcast requests in the at least one broadcast request. In other words, in some embodiments of the present disclosure, a plurality of broadcast data of the same service application may be carried in the same broadcast message for broadcast.

In some other embodiments of the present disclosure, the same broadcast message that supports multiple broadcast techniques may be broadcasted by multiple broadcast techniques.

In some embodiments of the present disclosure, after broadcast data of multiple broadcast protocols supported by a broadcast device are broadcasted through the broadcast message with the preset content parameters, one or more discovering devices may acquire the broadcast message with the present content parameters.

Figure 2:
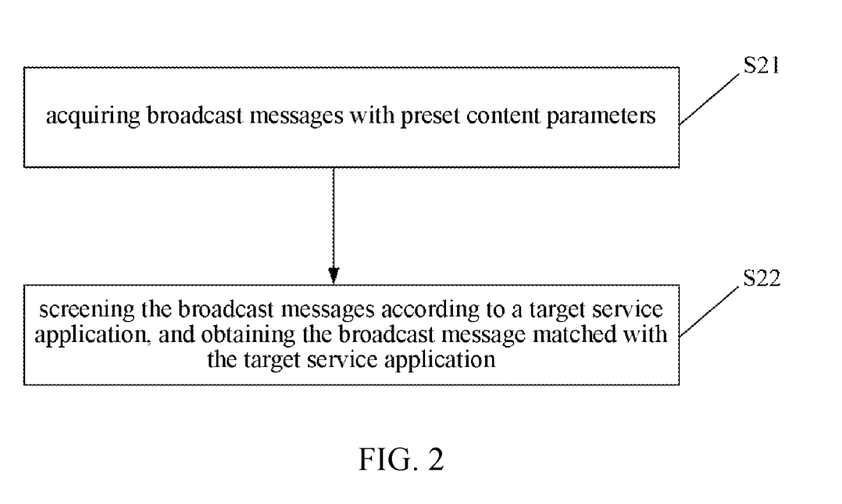
FIG. 2 is a flowchart illustrating a discovering method according to some embodiments.

FIG. 2 is a flowchart illustrating a broadcasting method according to some embodiments. Referring to FIG. 2, the discovering method comprises:

S21: acquiring broadcast messages with preset content parameters.

S22: screening the broadcast messages according to a target service application, and obtaining the broadcast message matched with the target service application.

In some embodiments of the present disclosure, the target service application may be determined according to service consumers' operation on a terminal. After the service consumer triggers the target service application, the terminal as the discovering device may determine screening conditions for screening the broadcast messages according to the target service application, and the screening conditions are used for screening out the broadcast message matched with the target service application. For instance, if the service consumer needs to utilize BLE technology to realize a Screen-Display Application, the screening condition is set to screen out a broadcast message matched with BLE.

Moreover, in some embodiments of the present disclosure, a broadcast message matched with the broadcast protocol version, the service application identification, the role, the broadcast device name and the broadcast configuration identification may be screened out according to one or more of the broadcast protocol version, the service application identification, the role, the broadcast device name and the broadcast configuration identification supported by the target service application.

In some embodiments of the present disclosure, after the discovering device screens out the broadcast message matched with the target service application, service information of the target service application may be obtained, and then be utilized for further service consumption.

In some embodiments of the present disclosure, the above methods that adopt the unified broadcast message for broadcast and discovery can support all scenes and be shared by multiple services.

In some embodiments of the present disclosure, the broadcast and discovery techniques that support different broadcast protocols may be combined, for example, one or more of currently proven reliable mDNS, BLE, NFC, UPNP and Wi-Fi Aware are combined, so that the broadcast and discovery of services can cover all the scenes.

Moreover, in some embodiments of the present disclosure, for setting the broadcast message with the preset content parameters, reasonable combination of broadcast and discovery methods may be selected by taking energy consumption factor into consideration according to broadcasting device capability, online conditions and service requirements. For example, a device that provides a target service may be rapidly discovered in the LAN environment by utilization of mDNS technical method according to online conditions of a broadcasting device. Meanwhile, the BLE technical method and the Wi-Fi Aware technical method with low power consumption may be utilized to broadcast the service provided by the device within certain range through broadcast wireless signals. The discovering device within the range may discover the device that provides the target service through corresponding broadcast wireless signal receiving device. Meanwhile, the discovering device may utilize the NFC technical method to trigger the exchange of broadcast information by approaching the broadcasting device.

Furthermore, in some embodiments of the present disclosure, the broadcasting device broadcasts the broadcast message with the preset content parameters, and the discovering device screens the received broadcast messages with the preset content parameters by utilization of the target service application to obtain the service information matched with the target service application, so that one device that supports multiple services can adopt the same broadcast and discovery behavior for broadcast and discovery, and same broadcast and discovery behavior may be adopted for the broadcast and discovery of the same service application on different devices. By adopting some embodiments of the present disclosure, a plurality of service applications may also be broadcasted and discovered on the same device for the same broadcast and discovery behavior.

As such, various embodiments of the present disclosure can realize the mutual compatibility between multiple different broadcast and discovery techniques, realize service discovery in all scenes, and improve resource utilization.

Based on the similar concept, some embodiments of the present disclosure further provides broadcasting and discovering devices.

It will be appreciated that the broadcasting and discovering devices according to some embodiments of the present disclosure includes corresponding hardware structures and/or software modules for executing various functions in order to realize the above functions. In combination with component and algorithm steps in various disclosed examples in some embodiments of the present disclosure, the embodiments of the present disclosure can be implemented in the form of hardware or in combination of hardware and computer software. Whether a specific function is executed by hardware or by adoption of computer software to drive hardware depends on the specific application and design constraints of the technical solution. Those skilled in the art may use different methods to implement the described functions for each specific application, but such implementation should not be construed as beyond the scope of the technical solutions of the embodiments of the present disclosure.

Figure 3:
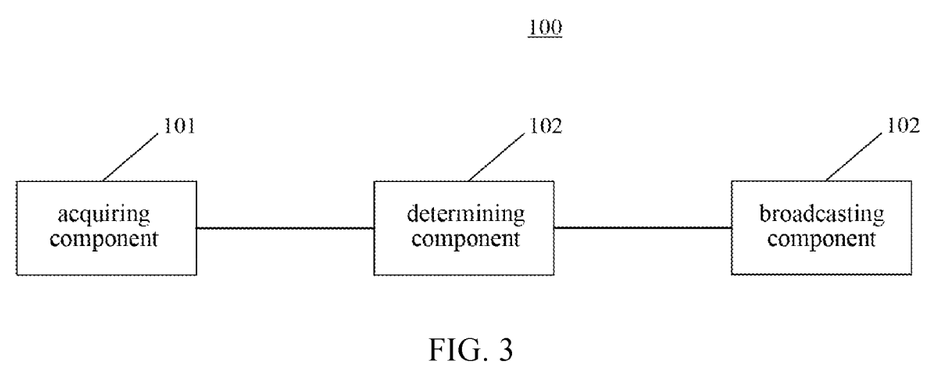
FIG. 3 is a block diagram illustrating a broadcasting device according to some embodiments.

FIG. 3 is a block diagram illustrating a broadcasting device according to some embodiments. Referring to FIG. 3, the broadcasting device 100 comprises an acquiring component 101, a determining component 102 and a broadcasting component 103.

The acquiring component 101 is configured to acquire and analyze a service application broadcast request. The determining component 102 is configured to determine a broadcast message with preset content parameters according to the service application broadcast request. The broadcasting component 103 is configured to broadcast the broadcast message.

In some embodiments, the preset content parameters include: broadcast protocol version parameter, service application parameter, role parameter that characterizes broadcast role or discovery role, broadcasting device name parameter, and broadcast configuration identification parameter.

In some other embodiments, the service application parameter includes service application identification, and different service application identifications are used for identifying different service applications.

In still some other embodiments, the preset content parameters also include broadcast data parameter.

When the service application broadcast request is at least one broadcast request of the same service application, the broadcast parameter can characterize broadcast data corresponding to all the broadcast requests among the at least one broadcast request.

In still some other embodiments, the broadcast data parameter includes at least one broadcast data identification, and different broadcast data identifications are used for identifying different broadcast data.

In still some other embodiments, the broadcasting component 103 adopts multiple broadcast techniques to broadcast the same broadcast message.

Figure 4:
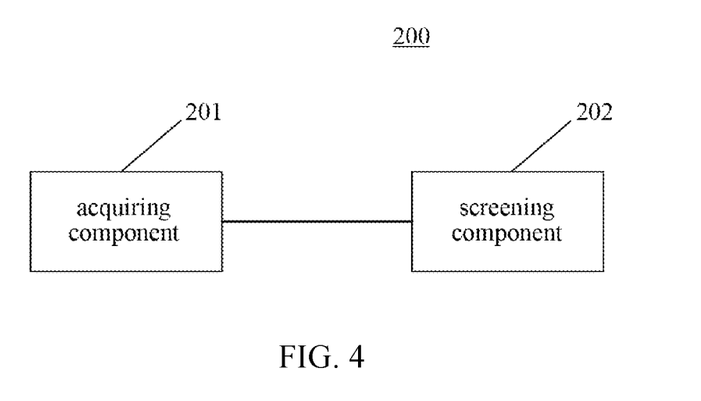
FIG. 4 is a block diagram illustrating a discovering device according to some embodiments.

FIG. 4 is a block diagram illustrating a discovering device according to some embodiments. Referring to FIG. 4, the discovering device 200 comprises an acquiring component 201 and a screening component 202.

The acquiring component 201 is configured to acquire broadcast messages with preset content parameters. The screening component 202 is configured to screen the broadcast messages according to a target service application and obtain the broadcast message matched with the target service application.

In some embodiments, the screen component 202 screens the broadcast messages according to the target service application and obtain the broadcast message matched with the target service application by the following means:

screening out a broadcast message matched with the broadcast protocol version, the service application identification, the role, the broadcast device name and the broadcast configuration identification according to one or more of the broadcast protocol version, the service application identification, the role, the broadcast device name and the broadcast configuration identification supported by the target service application.

Regarding the device in the above embodiment, the specific manner in which each module operates has been described in detail in the embodiments of the methods, and will not be explained here in detail.

Figure 5:
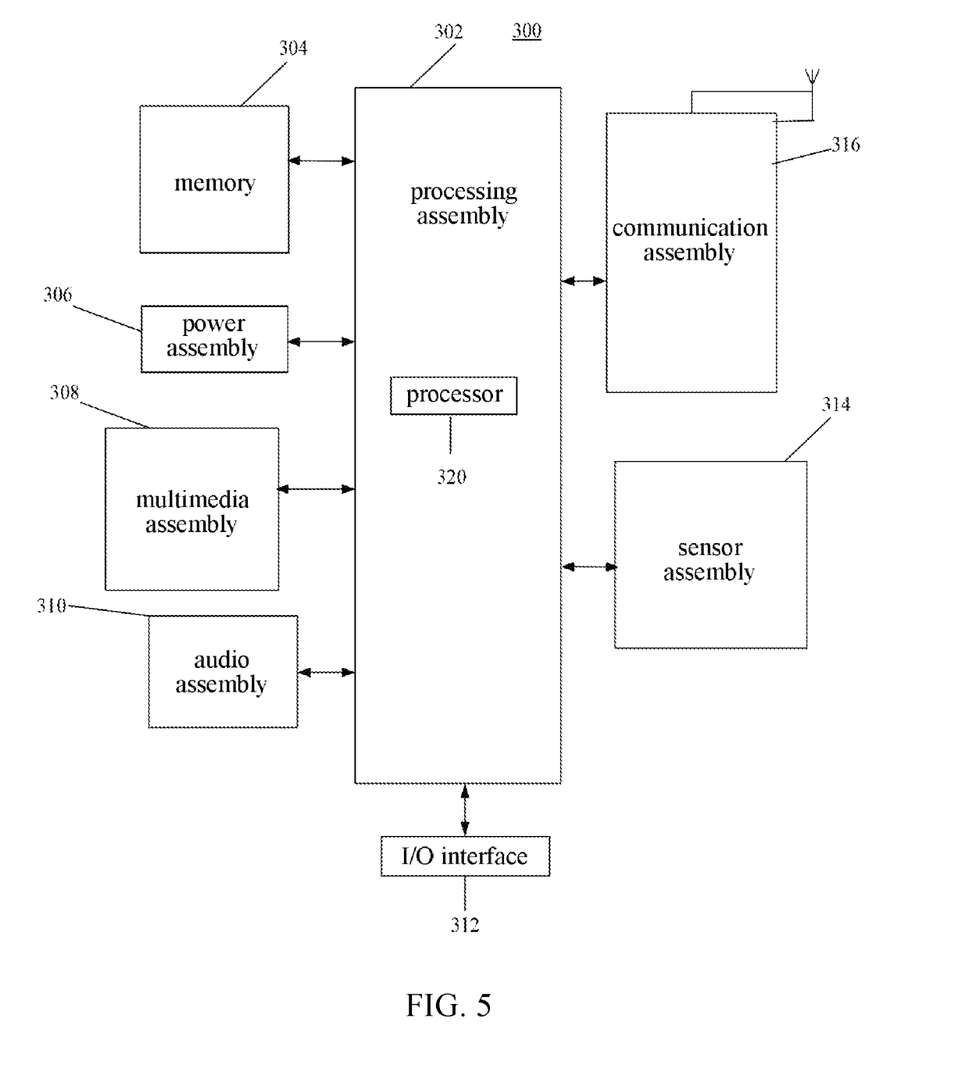
FIG. 5 is a block diagram illustrating a broadcasting and discovering device according to some embodiments.

FIG. 5 is a block diagram illustrating a device 300 for broadcast or discovery according to some embodiments. For example, the device 300 may be a mobile phone, a computer, a digital broadcasting terminal, a messaging device, a game console, a tablet, a medical device, a fitness apparatus, a personal digital assistant, and the like.

Referring to FIG. 5, the device 300 may comprise one or more of a processing assembly 302, a memory 304, a power assembly 306, a multi-media assembly 308, an audio assembly 310, an input/output (I/O) interface 312, a sensor assembly 314 and a communication assembly 316.

The processing assembly 302 typically controls overall operations of the device 300, such as the operations associated with display, telephone calls, data communications, camera operations, and recording operations. The processing assembly 302 may include one or more processors 320 to execute instructions to perform all or part of the steps in the above described methods. Moreover, the processing assembly 302 may include one or more modules which facilitate the interaction between the processing assembly 302 and other assemblies. For instance, the processing assembly 302 may include a multimedia module to facilitate the interaction between the multimedia assembly 308 and the processing assembly 302.

The memory 304 is configured to store various types of data to support the operation of the device 300. Examples of such data include instructions for any applications or methods operated on the device 300, contact data, phonebook data, messages, pictures, video, etc. The memory 304 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power assembly 306 provides power to various assemblies of the device 300. The power assembly 306 may include a power management system, one or more power sources, and any other assemblies associated with the generation, management, and distribution of power in the device 300.

The multimedia assembly 308 includes a screen providing an output interface between the device 300 and the user. In some embodiments, the screen may include a liquid crystal display (LCD) and a touch panel (TP). In some embodiments, the screen may include an organic light-emitting diode (OLED) display or other types of displays. If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia assembly 308 includes a front camera and/or a rear camera. The front camera and the rear camera may receive an external multimedia datum while the device 300 is in an operation mode, such as a photographing mode or a video mode. Each of the front camera and the rear camera may be a fixed optical lens system or have focus and optical zoom capability.

The audio assembly 310 is configured to output and/or input audio signals. For example, the audio assembly 310 includes a microphone ("MIC") configured to receive an external audio signal when the device 300 is in an operation mode, such as a call mode, a recording mode, and a voice recognition mode. The received audio signal may be further stored in the memory 304 or transmitted via the communication assembly 316. In some embodiments, the audio assembly 310 further includes a speaker to output audio signals.

The I/O interface 312 provides an interface between the processing assembly 302 and peripheral interface modules, such as a keyboard, a click wheel, buttons, and the like. The buttons may include, but are not limited to, a home button, a volume button, a starting button, and a locking button.

The sensor assembly 314 includes one or more sensors to provide status assessments of various aspects of the device 300. For instance, the sensor assembly 314 may detect an open/closed status of the device 300, relative positioning of assemblies, e.g., the display and the keypad, of the device 300, a change in position of the device 300 or an assembly of the device 300, a presence or absence of user contact with the device 300, an orientation or an acceleration/deceleration of the device 300, and a change in temperature of the device 300. The sensor assembly 314 may include a proximity sensor configured to detect the presence of nearby objects without any physical contact. The sensor assembly 314 may also include a light sensor, such as a CMOS or CCD image sensor, for use in imaging applications. In some embodiments, the sensor assembly 314 may also include an accelerometer sensor, a gyroscope sensor, a magnetic sensor, a pressure sensor, or a temperature sensor.

The communication assembly 316 is configured to facilitate communication, wired or wirelessly, between the device 300 and other devices. The device 300 can access a wireless network based on a communication standard, such as Wi-Fi, 2G, 3G, 4G or 5G, or a combination thereof. In one exemplary embodiment, the communication assembly 316 receives a broadcast signal or broadcast associated information from an external broadcast management system via a broadcast channel. In one exemplary embodiment, the communication assembly 316 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 300 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic assemblies, for performing the above described methods.

In exemplary embodiments, there is also provided a non-transitory computer-readable storage medium including instructions, such as included in the memory 304, executable by the processor 320 in the device 300, for performing the above-described methods. For example, the non-transitory computer-readable storage medium may be a ROM, a random-access memory (RAM), a CD-ROM, a magnetic tape, a floppy disc, an optical data storage device, and the like.

Various embodiments of the present disclosure can have one or more the following advantages. As the broadcast message with the preset content parameters is broadcasted in the process of broadcasting the broadcast message, and the target service application is utilized to screen the received broadcast messages with the preset content parameters and obtain service information matched with the target service application in the process of discovering the broadcast message, the mutual compatibility between multiple different broadcast and discovery techniques, and service discovery in all scenes can be realized, and resource utilization can be improved.

It will be appreciated that the singular forms "a," "the," and "the above-mentioned" in the present disclosure are intended to include the plural forms as well, unless the context clearly indicates otherwise.

It will be further appreciated that although operations are described in a specific order in the drawings in the embodiments of the present disclosure, it should not be construed as requiring that the operations be performed in the specific order or serial order shown, or that all operations shown be performed to get desired results. In certain environments, multitasking and parallel processing may be advantageous.

Other embodiments of the disclosure will be apparent to those skilled in the art from consideration of the specification and practice of the various embodiments disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

The above description includes part of embodiments of the present disclosure, and not limits the present disclosure. Any modifications, equivalent substitutions, improvements, etc., within the spirit and principles of the present disclosure, are included in the scope of protection of the present disclosure.

It is apparent that those of ordinary skill in the art can make various modifications and variations to the embodiments of the disclosure without departing from the spirit and scope of the disclosure. Thus, it is intended that the present disclosure cover the modifications and the modifications.

Various embodiments in this specification have been described in a progressive manner, where descriptions of some embodiments focus on the differences from other embodiments, and same or similar parts among the different embodiments are sometimes described together in only one embodiment.

It should also be noted that in the present disclosure, relational terms such as first and second, etc., are only used to distinguish one entity or operation from another entity or operation, and do not necessarily require or imply these entities having such an order or sequence. It does not necessarily require or imply that any such actual relationship or order exists between these entities or operations.

Moreover, the terms "include," "including," or any other variations thereof are intended to cover a non-exclusive inclusion within a process, method, article, or apparatus that comprises a list of elements including not only those elements but also those that are not explicitly listed, or other elements that are inherent to such processes, methods, goods, or device.

In the case of no more limitation, the element defined by the sentence "includes a . . . " does not exclude the existence of another identical element in the process, the method, or the device including the element.

Specific examples are used herein to describe the principles and implementations of some embodiments. The description is only used to help convey understanding of the possible methods and concepts. Meanwhile, those of ordinary skill in the art can change the specific manners of implementation and application thereof without departing from the spirit of the disclosure. The contents of this specification therefore should not be construed as limiting the disclosure.

For example, in the description of the present disclosure, the terms "some embodiments," or "example," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In the descriptions, with respect to circuit(s), unit(s), device(s), component(s), etc., in some occurrences singular forms are used, and in some other occurrences plural forms are used in the descriptions of various embodiments. It should be noted; however, the single or plural forms are not limiting but rather are for illustrative purposes. Unless it is expressly stated that a single unit, device, or component etc. is employed, or it is expressly stated that a plurality of module, devices or components, etc. are employed, the circuit(s), unit(s), device(s), component(s), etc. can be singular, or plural.

Based on various embodiments of the present disclosure, the disclosed apparatuses, devices, and methods can be implemented in other manners. For example, the abovementioned devices can employ various methods of use or implementation as disclosed herein.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

Dividing the device into different "regions," "module," "components" or "layers," etc. merely reflect various logical functions according to some embodiments, and actual implementations can have other divisions of "regions," "module," "components" or "layers," etc. realizing similar functions as described above, or without divisions. For example, multiple regions, modules, or layers, etc. can be combined or can be integrated into another system. In addition, some features can be omitted, and some steps in the methods can be skipped.

Those of ordinary skill in the art will appreciate that the module, components, regions, or layers, etc. in the devices provided by various embodiments described above can be provided in the one or more devices described above. They can also be located in one or multiple devices that is (are) different from the example embodiments described above or illustrated in the accompanying drawings. For example, the module, regions, or layers, etc. in various embodiments described above can be integrated into one module or divided into several sub-modules.

The various device components, modules, blocks, units, or portions may have modular configurations, or are composed of discrete components, but nonetheless can be referred to as "modules" in general. In other words, the "components," "modules," "blocks," "units," "portions," or "module" referred to herein may or may not be in modular forms, and these phrases may be interchangeably used.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

The order of the various embodiments described above are only for the purpose of illustration, and do not represent preference of embodiments.

Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to the disclosed aspects of the exemplary embodiments can be made in addition to those described above by a person of ordinary skill in the art having the benefit of the present disclosure without departing from the spirit and scope of the disclosure contemplated by this disclosure and as defined in the following claims. As such, the scope of this disclosure is to be accorded the broadest reasonable interpretation so as to encompass such modifications and equivalent structures.

The invention claimed is:

1. A broadcasting method, comprising:
    acquiring and analyzing a service application broadcast request;
    determining a broadcast message with preset content parameters according to the service application broadcast request, the preset content parameters comprising broadcast protocol version parameter, service application parameter, role parameter characterizing broadcast role or discovery role, broadcasting device name parameter, and broadcast configuration identification parameter, content and format contained in the broadcast message are uniformly defined in advance; and
    broadcasting the broadcast message.

2. The broadcasting method according to claim 1, wherein the service application parameter comprises service application identification for identifying corresponding service application.

3. The broadcasting method according to claim 1, wherein the preset content parameters further include broadcast data parameter; and
    when the service application broadcast request includes at least one broadcast request of the same service application, the broadcast parameter can characterize broadcast data corresponding to all the broadcast requests in the at least one broadcast request.

4. The broadcasting method according to claim 3, wherein the broadcast data parameter includes at least one broadcast data identification for identifying corresponding broadcast data.

5. The broadcasting method according to claim 1, wherein the broadcasting the broadcast message includes:
    broadcasting the same broadcast message by multiple broadcast techniques.

6. A broadcasting device implementing the broadcasting method according to claim 1, comprising:
    a processor; and
    memory storing instructions for execution by the processor to implement operations of the broadcasting method.

7. A non-transitory computer-readable storage medium having stored therein computer-executable instructions, implementing the broadcasting method of claim 1 when the computer-executable instructions are executed by a processor.

8. A communication system implementing the method of claim 1, wherein the broadcast message with the preset content parameters is broadcasted in the broadcasting the broadcast message, and a target service application is utilized to screen the received broadcast messages with the preset content parameters and obtain service information matched with the target service application in discovering the broadcast message, thereby realizing mutual compatibility between multiple different broadcast and discovery techniques, and improving resource utilization.

9. The communication system of claim 8, comprising at least one broadcasting device and a plurality of discovering devices having the multiple different broadcast and discovery techniques therebetween, including at least two of multicast domain name system (mDNS), Bluetooth low energy (BLE), near field communication (NFC), universal plug and play (UPNP), and Wi-Fi Aware techniques.

10. A discovering method, comprising:
    acquiring broadcast messages with preset content parameters, the preset content parameters comprising broadcast protocol version parameter, service application parameter, role parameter characterizing broadcast role or discovery role, broadcasting device name parameter, and broadcast configuration identification parameter, content and format contained in the broadcast message are uniformly defined in advance; and
    screening the broadcast messages in accordance with a target service application, to obtain the broadcast message matched with the target service application.

11. The discovering method according to claim 10, wherein the screening the broadcast messages in accordance with the target service application to obtain the broadcast message matched with the target service application includes:
    screening out the broadcast message matched with the broadcast protocol version, the service application identification, the role, the broadcasting device name and the broadcast configuration identification according to one or more of the broadcast protocol version, the service application identification, the role, the broadcasting device name and the broadcast configuration identification supported by the target service application.

12. A discovering device implementing the discovering method according to claim 10, comprising:
    a processor; and
    memory storing instructions for execution by the processor to implement operations of the discovering method.

13. A non-transitory computer-readable storage medium having stored therein computer-executable instructions, implementing the discovering method of claim 10 when the computer-executable instructions are executed by a processor.

14. A broadcasting device, comprising:
    an acquiring component configured to acquire and analyze a service application broadcast request;
    a determining component configured to determine a broadcast message with preset content parameters according to the service application broadcast request, the preset content parameters comprising broadcast protocol version parameter, service application parameter, role parameter that characterizes broadcast role or discovery role, broadcasting device name parameter and broadcast configuration identification parameter, content and format contained in the broadcast message are uniformly defined in advance; and
    a broadcasting component configured to broadcast the broadcast message.

15. The broadcasting device according to claim 14, wherein the service application parameter includes service application identification for identifying corresponding service application.

16. The broadcasting device according to claim 14, wherein the preset content parameters further include broadcast data parameter; and when the service application broadcast request includes at least one broadcast request of the same service application, the broadcast parameter can characterize broadcast data corresponding to all the broadcast requests in the at least one broadcast request.

17. The broadcasting device according to claim 16, wherein the broadcast data parameter comprises at least one broadcast data identification for identifying corresponding broadcast data.

18. The broadcasting device according to claim 14, wherein the broadcasting component is configured to broadcast the same broadcast message by multiple broadcast techniques.

19. A discovering device, comprising:

an acquiring component configured to acquire broadcast messages with preset content parameters, the preset content parameters comprising broadcast protocol version parameter, service application parameter, role parameter that characterizes broadcast role or discovery role, broadcast device name parameter, and broadcast configuration identification parameter, content and format contained in the broadcast message are uniformly defined in advance; and a screening component configured to screen the broadcast messages according to a target service application so as to obtain the broadcast message matched with the target service application.

20. The discovering device according to claim 19, wherein the screening component is configured to screen out the broadcast message matched with the broadcast protocol version, the service application identification, the role, the broadcasting device name and the broadcast configuration identification, according to one or more of the broadcast protocol version, the service application identification, the role, the broadcasting device name and the broadcast configuration identification supported by the target service application.

\* \* \* \* \*